(12) United States Patent
Furusawa et al.

(10) Patent No.: US 8,925,961 B2
(45) Date of Patent: Jan. 6, 2015

(54) CURTAIN AIRBAG DEVICE

(71) Applicants: Kabushiki Kaisha Toyota Jidoshokki, Kariya-shi, Aichi (JP); Toyota Jidosha Kabushiki Kaisha, Toyota-shi, Aichi (JP)

(72) Inventors: Katsuhito Furusawa, Kariya (JP); Naoyuki Takahashi, Toyota (JP)

(73) Assignees: Kabushiki Kaisha Toyota Jidoshokki, Aichi (JP); Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 14/204,288

(22) Filed: Mar. 11, 2014

(65) Prior Publication Data

US 2014/0265273 A1 Sep. 18, 2014

(30) Foreign Application Priority Data

Mar. 12, 2013 (JP) .................... 2013-049391

(51) Int. Cl.
*B60R 21/213* (2011.01)
*B60R 21/215* (2011.01)
*B60R 21/237* (2006.01)

(52) U.S. Cl.
CPC ............. *B60R 21/213* (2013.01); *B60R 21/215* (2013.01); *B60R 21/237* (2013.01)
USPC ..................... 280/730.2; 280/728.2

(58) Field of Classification Search
USPC .......................... 280/728.2, 730.2
See application file for complete search history.

(56) References Cited

U.S. PATENT DOCUMENTS

| | | | | |
|---|---|---|---|---|
| 6,217,061 | B1* | 4/2001 | Harland et al. ............ | 280/730.2 |
| 6,254,123 | B1* | 7/2001 | Urushi et al. ............. | 280/730.2 |
| 7,134,682 | B2* | 11/2006 | Totsuka et al. ............ | 280/728.2 |
| 7,182,366 | B2* | 2/2007 | Enriquez .................... | 280/730.2 |
| 7,322,601 | B2* | 1/2008 | Bertossi ..................... | 280/730.2 |
| 7,731,227 | B2* | 6/2010 | Hotta et al. ................ | 280/730.2 |
| 7,735,854 | B2* | 6/2010 | Chang ........................ | 280/728.2 |
| 7,934,748 | B2* | 5/2011 | Torii .......................... | 280/730.2 |
| 8,220,826 | B2* | 7/2012 | Park et al. .................. | 280/728.2 |
| 2007/0090634 | A1* | 4/2007 | Jang et al. ................. | 280/730.2 |
| 2013/0154243 | A1* | 6/2013 | Glaser et al. .............. | 280/728.3 |

FOREIGN PATENT DOCUMENTS

| | | | |
|---|---|---|---|
| JP | 2000-033845 | A | 2/2000 |
| JP | 2002-053005 | A | 2/2002 |
| JP | 2002-178870 | A | 6/2002 |
| JP | 2004-098783 | A | 4/2004 |
| JP | 2008-162473 | A | 7/2008 |
| JP | 2008-296644 | A | 12/2008 |
| JP | 2009-113809 | A | 5/2009 |
| JP | 2011-005964 | A | 1/2011 |
| JP | 2011-102102 | A | 5/2011 |

* cited by examiner

*Primary Examiner* — Drew Brown
(74) *Attorney, Agent, or Firm* — Sughrue Mion, PLLC

(57) ABSTRACT

A curtain airbag device has an airbag that is accommodated in a state where the airbag is wound or folded; a bracket that has a guiding plate portion which guides the airbag inward in a passenger compartment of a vehicle when the airbag is deployed and is provided with a fragile portion, the bracket is fixed to an upper portion of an inner panel of a vehicle body; and a cover sheet that, when the airbag is deployed, covers the fragile portion in a state where the cover sheet is positioned between the airbag and the guiding plate portion.

12 Claims, 7 Drawing Sheets

CURTAIN AIRBAG DEVICE

BACKGROUND OF THE INVENTION

1. Field of the Invention

The present invention relates to a curtain airbag device that is accommodated in an upper portion of a vehicle passenger compartment.

2. Related Background Art

For example, as disclosed in Japanese Unexamined Patent Application Publication No. 2011-102102, a curtain airbag device includes a cushion portion, an inflator that inflates and deploys the cushion portion, and a bracket portion that guides the cushion portion to be inflated and deployed inward in a passenger compartment of a vehicle. The bracket portion serves to guide the cushion portion to be inflated and deployed. The bracket portion prevents the cushion portion to be inflated and deployed from entering a gap between a pillar garnish and an inner panel, or from being hooked in an upper end portion of the pillar garnish.

The bracket portion is necessary to have such a strength that the bracket portion is unlikely to easily deform when a deploying force of the cushion portion is exerted on the bracket portion. Taking into consideration a possibility that the head of an occupant collides with the bracket portion, the bracket portion is necessary to absorb an impact load.

In a head protection airbag device disclosed in Japanese Unexamined Patent Application Publication No. 2002-53005, a notched portion is provided in a guide wall of a deployment assistance member. The deployment assistance member is equivalent to the bracket portion in Japanese Unexamined Patent Application Publication No. 2011-102102. The guide wall is likely to be plastically or elastically deformed by the notched portion. As a result, the guide wall absorbs an impact load. There are Japanese Unexamined Patent Application Publication No. 2004-98783, Japanese Unexamined Patent Application Publication No. 2008-162473 and the like as public documents in which the curtain airbag device is disclosed.

SUMMARY OF THE INVENTION

In the head protection airbag device disclosed in Japanese Unexamined Patent Application Publication No. 2002-53005, the notched portion is provided in the guide wall of the deployment assistance member. Accordingly, when an impact load is exerted on the deployment assistance member, the guide wall is likely to be plastically or elastically deformed, and the guide wall absorbs the impact load.

However, the structure has the following point for improvement. When an airbag bag is inflated, there is a concern in that the airbag bag is hooked in the notched portion which is provided in the guide wall of the deployment assistance member. That is, when the notched portion is provided in the guide wall, an impact load is effectively absorbed, but there is a concern in that a deployability of the airbag bag deteriorates.

An object of the present invention is to provide a curtain airbag device that can have both an impact absorbability of a bracket portion and a deployability of an airbag which is better than that of an airbag in the related art.

According to an aspect of the present invention, a curtain airbag device that is accommodated in an upper portion of a passenger compartment of a vehicle has an airbag, a bracket, and a cover sheet. The airbag is accommodated in a state where the airbag is wound or folded. The bracket has a guiding plate portion. The guiding plate portion is provided with a fragile portion and guides the airbag inward in the passenger compartment of the vehicle when the airbag is deployed. The bracket is fixed to an upper portion of an inner panel of a vehicle body. When the airbag is deployed, the cover sheet covers the fragile portion in a state where the cover sheet is interposed between the airbag and the guiding plate portion.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Hereinafter, embodiments will be described with reference to the accompanying drawings.

(First Embodiment)

Figure 1:
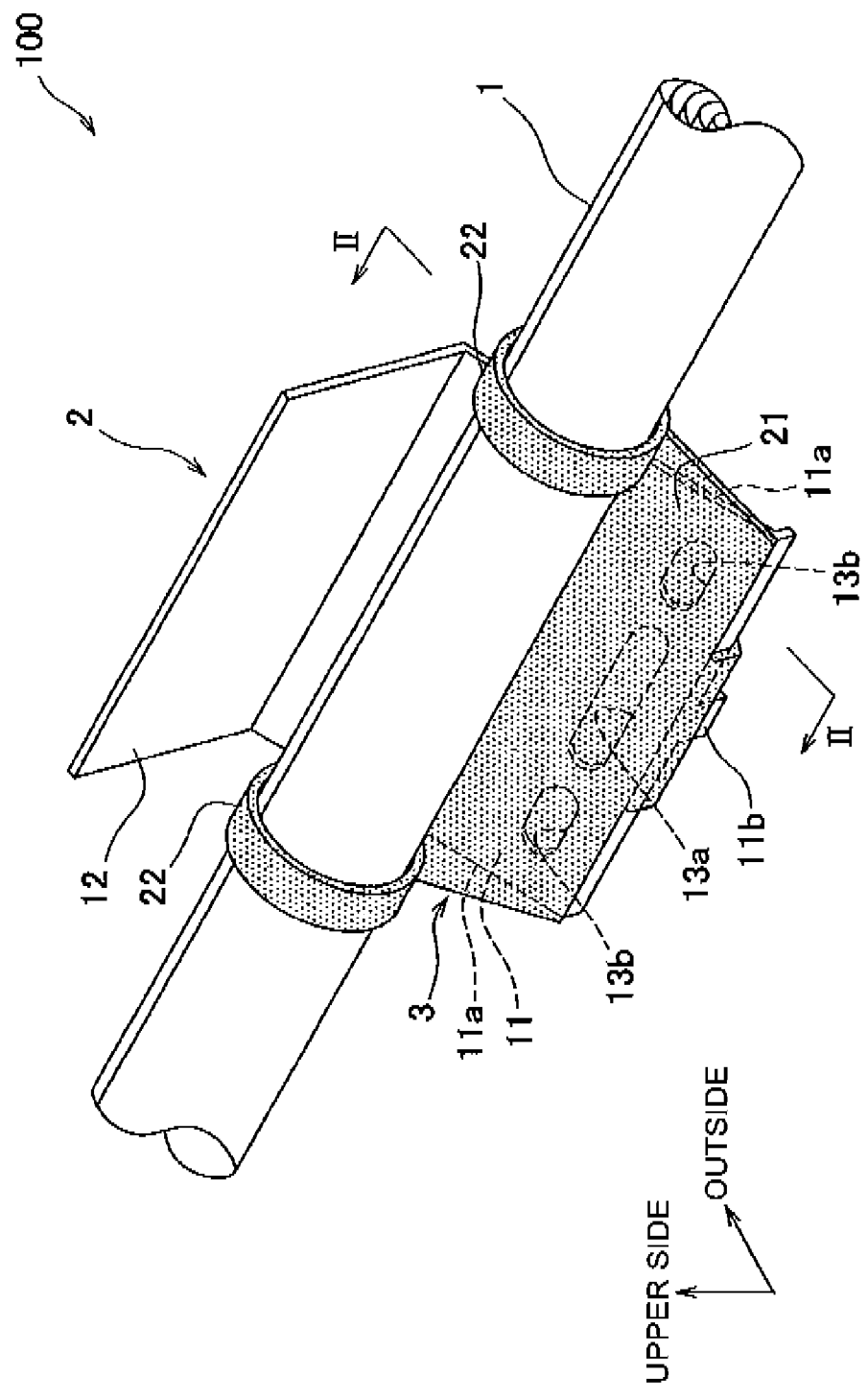
FIG. 1 is a perspective view of a curtain airbag device according to a first embodiment.
Figure 2:
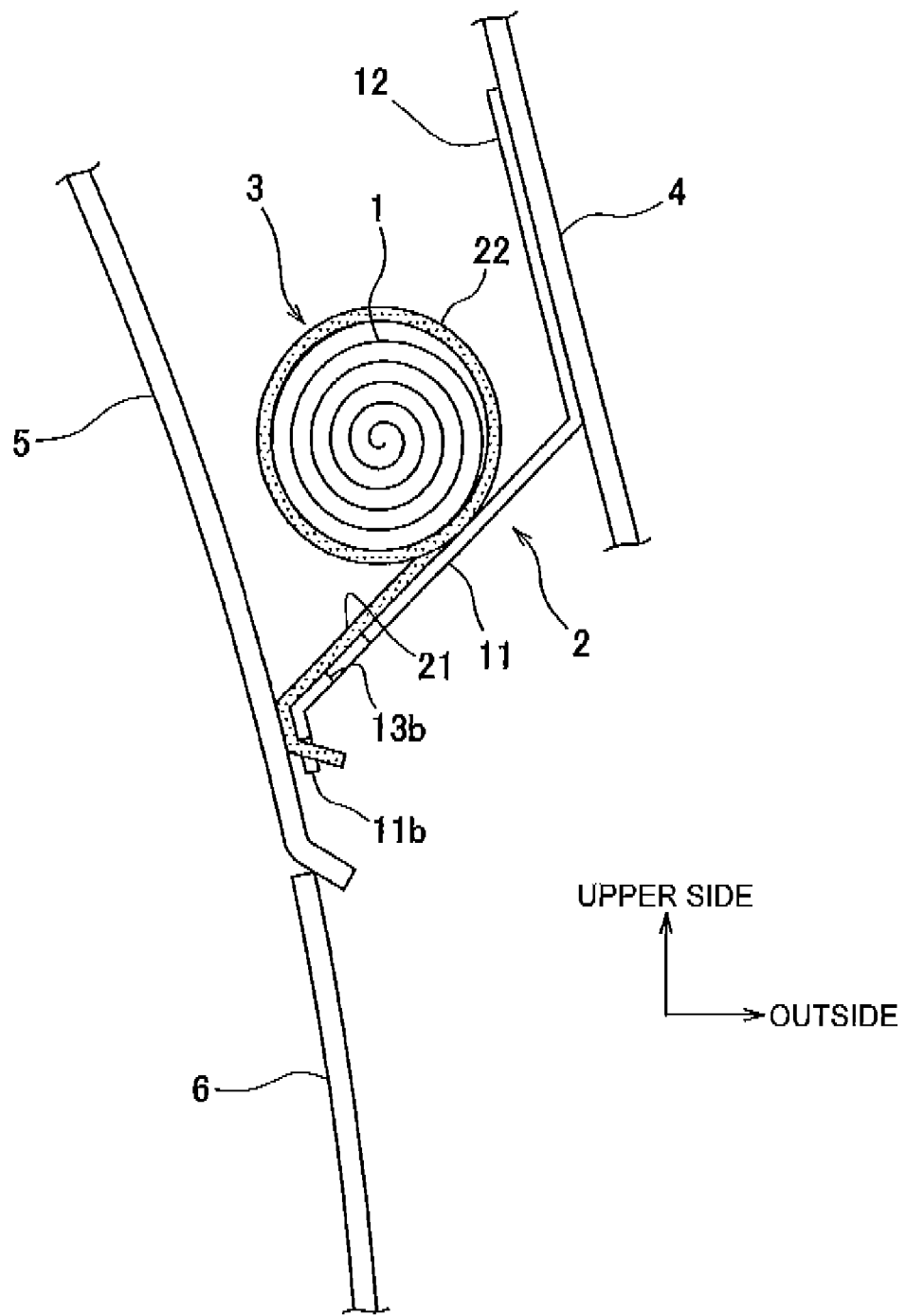
FIG. 2 is a cross-sectional view taken along line II-II in FIG. 1.
Figure 3:
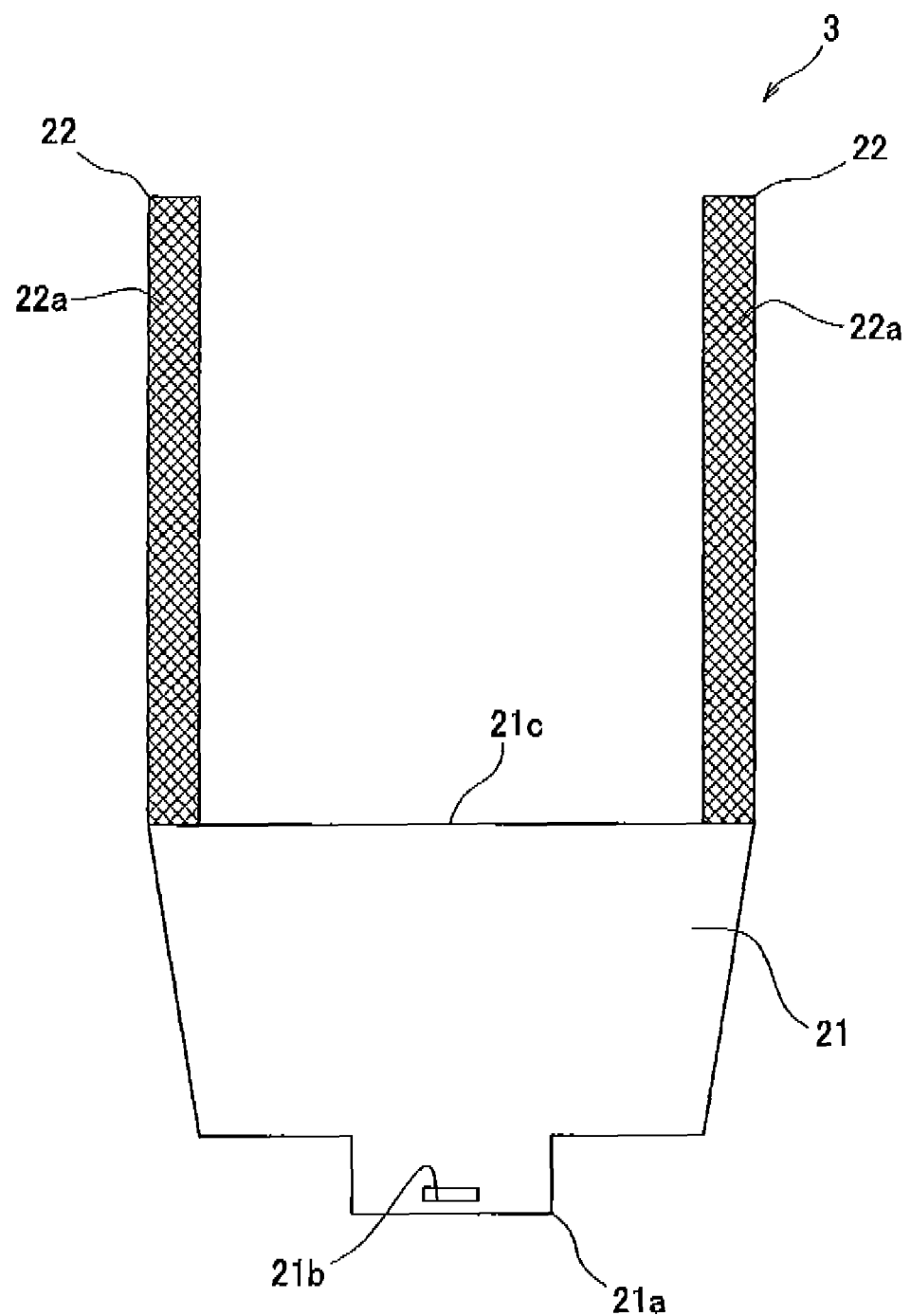
FIG. 3 is a top view of a cover sheet.

A curtain airbag device 100 according to a first embodiment will be described with reference to FIGS. 1 to 4. In FIGS. 1 to 3, an upward direction and an outward direction of a vehicle body are illustrated by arrows, respectively. The curtain airbag device 100 includes an airbag 1, a sensor (not illustrated), and an inflator (not illustrated). The airbag 1 is inflated and deployed when a vehicle undergoes a collision (when a vehicle undergoes a side collision) or when a vehicle rolls over (when a vehicle tips over onto the side thereof). The sensor detects a collision or a rollover of a vehicle. The inflator operates based on a signal from the sensor, and supplies gas into the airbag 1. That is, the inflator injects gas into the airbag 1. The curtain airbag device 100 is accommodated in a side upper portion of a passenger compartment of a vehicle. A typical overall configuration and arrangement of a curtain airbag device is disclosed in FIG. 6 in Japanese Unexamined Patent Application Publication No. 2002-53005, in FIG. 1 in Japanese Unexamined Patent Application Publication No. 2011-102102 or the like. In the embodiment, the curtain airbag device 100 is accommodated in the upper side portion of the passenger compartment of the vehicle, but a position where the curtain airbag device is accommodated (a position where the curtain airbag device is arranged) is not limited to the embodiment. The curtain airbag device may be accommodated (may be arranged) in a front upper portion, a rear upper portion, a center upper portion or the like of the vehicle (the passenger compartment of the vehicle) to be inflated and deployed when the vehicle undergoes a front end collision or a rear end collision. The curtain airbag device may be accommodated (may be arranged) in not only the side upper portion but also the front upper portion, the rear upper portion, the center upper portion and the like of the passenger compartment of the vehicle. In this case, it is possible to deal with any case of a side collision (or a tip over onto a side), a front end collision and a rear end collision of the vehicle.

<Airbag>

As illustrated in FIGS. 1 and 2, the airbag 1 in the embodiment is accommodated in the side upper portion of the passenger compartment of the vehicle in a state where the airbag 1 is wound in a rolled shape. For example, as illustrated in Japanese Unexamined Patent Application Publication No. 2002-53005, the airbag may be accommodated in a state where the airbag is folded in a bellows shape.

<Bracket>

The curtain airbag device 100 includes a bracket 2. The bracket 2 is fixed to an upper portion of an inner panel 4 on a side of a side surface of the vehicle body. When the airbag 1 is inflated and deployed, the bracket 2 guides the airbag 1 inward in the passenger compartment of the vehicle. For example, the bracket 2 is made of a metal or a resin.

The bracket 2 has a guiding plate portion 11 and an attachment plate portion 12. The guiding plate portion 11 guides the airbag 1 inward in the passenger compartment of the vehicle. The attachment plate portion 12 extends upward from an end of the guiding plate portion 11. The attachment plate portion 12 is fixed to the inner panel 4. For example, the attachment plate portion 12 is fixed to the inner panel 4 by a bolt and nut. The airbag 1 is inflated and deployed inward in the passenger compartment of the vehicle from between a roof head lining 5 and a pillar garnish 6, and the bracket 2 prevents the airbag 1 from entering a gap between the pillar garnish 6 and the inner panel 4. Or, the airbag 1 is inflated and deployed inward in the passenger compartment of the vehicle from between the roof head lining 5 and the pillar garnish 6, and the bracket 2 prevents the airbag 1 from being hooked in an upper end portion of the pillar garnish 6.

A plurality of slits 13a and 13b (fragile portions) are provided in an end portion of the guiding plate portion 11 on a side opposite a side on which the attachment plate portion 12 is provided. In the embodiment, the three slits 13a and 13b are provided in the end portion of the guiding plate portion 11. The plurality of slits 13a and 13b function, as impact absorbing members when the head of an occupant and the like collide with the guiding plate portion 11. That is, the plurality of slits 13a and 13b are provided to collapse by an impact load. Both of the slits 13a and 13b has an elliptical shape. The slit 31a has a length greater than those of the slits 13b that are provided on both sides of the slit 13a. Each of the slits 13a and 13b have the same width. The three slits 13a and 13b are provided in a line along an axial direction of the airbag 1 that is wound in a rolled shape. The shape and the arrangement of the fragile portion provided in the guiding plate portion 11 are not limited to the embodiment.

<Cover Sheet>

Figure 4:
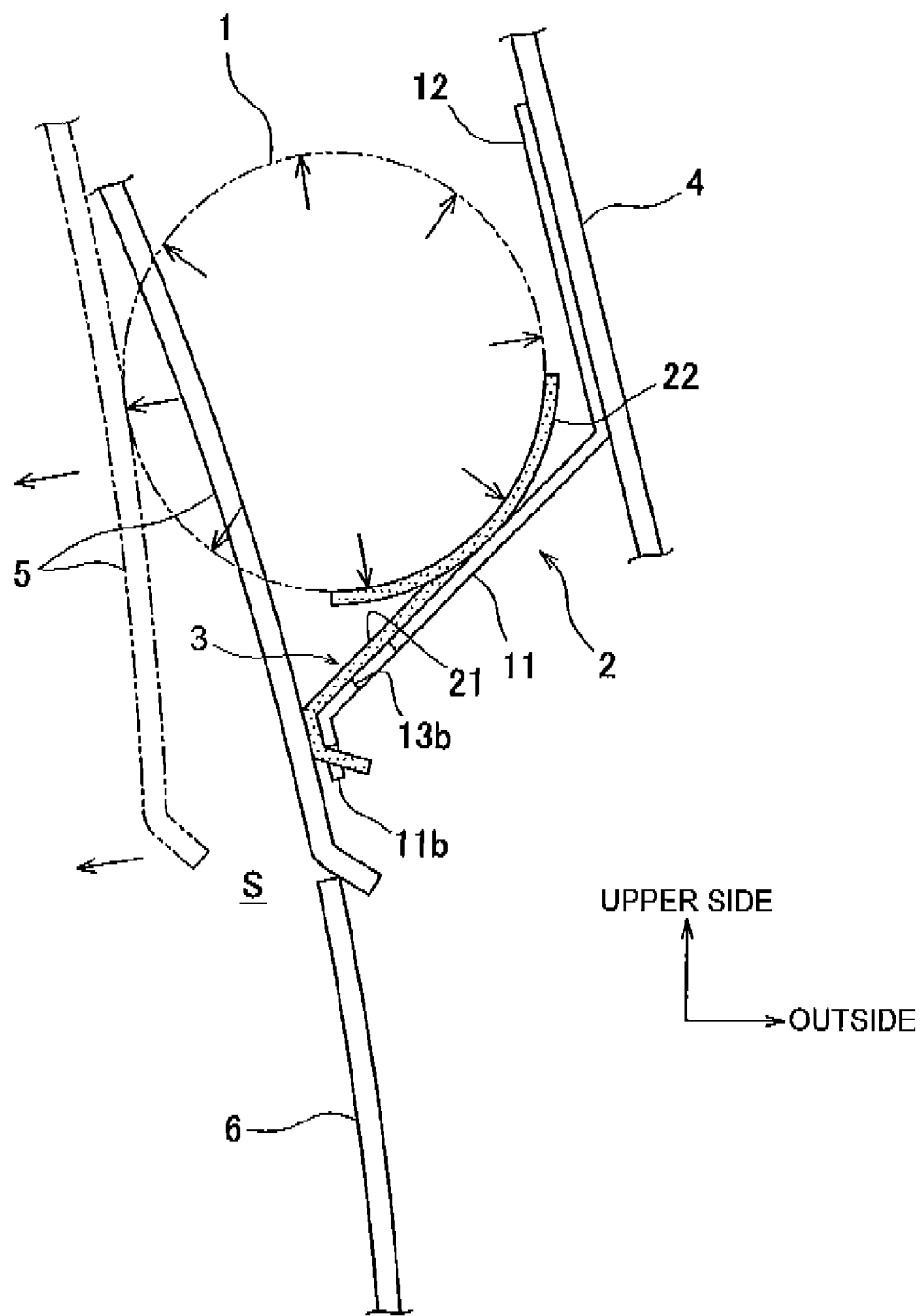
FIG. 4 is a view illustrating a state where an airbag is being inflated.

The curtain airbag device 100 includes a cover sheet 3 (indicated by dot hatching in FIGS. 1, 2, and 4). The cover sheet 3 is arranged on the guiding plate portion 11. When the airbag 1 is inflated and deployed, the cover sheet 3 covers all the slits 13a and 13b in a state where the cover sheet 3 is interposed between the airbag 1 and the guiding plate portion 11.

The cover sheet 3 has a main sheet body portion 21 and an airbag fixation portion 22. In the embodiment, the cover sheet 3 has a pair of airbag fixation portions 22. When the airbag 1 is inflated and deployed, the main sheet body portion 21 covers all the slits 13a and 13b. The airbag fixation portions 22 are fixed to the airbag 1 that is not inflated and not deployed. Accordingly, the cover sheet 3 is fixed to the airbag 1 that is not inflated and not deployed. The material of the cover sheet 3 is a soft resin, waterproof coated paper or a cloth. That is, the cover sheet 3 is made of a flexible material. In FIG. 1 and the like, the cover sheet 3 is schematically illustrated, and the thickness of the cover sheet 3 as the embodiment is not exactly represented. The cover sheet 3 may also be made of a cover sheet having a thickness smaller than the thickness illustrated (a second embodiment to be described later also is the same in this point).

In the embodiment, the main sheet body portion 21 covers not only all the slits 13a and 13b but also both ends 11a of the guiding plate portion 11 in a direction orthogonal to a deployment direction of the airbag 1. The main sheet body portion 21 may not cover the both ends 11a of the guiding plate portion 11.

As illustrated in FIG. 3 and the like, the main sheet body portion 21 has a trapezoidal shape in which a width of the main sheet body portion 21 becomes gradually narrow from a proximal end portion 21c thereof to a distal-end side thereof. A hooking portion 21a is provided with a slit 21b, and is provided in a distal end portion of the main sheet body portion 21.

Each of the airbag fixation portions 22 has a straplike shape. The airbag fixation portions 22 are provided at both ends of the proximal end portion 21c of the main sheet body portion 21, respectively. An adhesive tape 22a (indicated by cross hatching in FIG. 3) is bonded to the entire surface of the airbag fixation portion 22. The adhesive tape 22a is not necessary to be bonded to the entire surface of the airbag fixation portion 22. The airbag fixation portions 22 are wound around the airbag 1 that is wound in a rolled shape. The airbag fixation portions 22 are fixed to the airbag 1 by the adhesive tapes 22a.

A hooking catch 11b is provided at a distal end of the guiding plate portion 11 in the deployment direction of the airbag 1. The hooking catch 11b is provided to protrude downward from a portion of the guiding plate portion 11 in which all the slits 13a and 13b (fragile portion) are provided. The hooking portion 21a (slit 21b) of the main sheet body portion 21 is hooked in the hooking catch 11b. That is, the hooking portion 21a (slit 21b) is engaged with the hooking catch 11b. Accordingly, the cover sheet 3 is fixed to an upper surface of the guiding plate portion 11 in advance.

An adhesive tape (not illustrated) or the like may be bonded to a back surface of the main sheet body portion 21. In this case, for example, the cover sheet 3 is fixed to the upper surface of the guiding plate portion 11 by the adhesive tape.

The airbag 1, the bracket 2 and the cover sheet 3 are fixed to each other. That is, the airbag 1, the bracket 2 and the cover sheet 3 are attached to each other. In this state, the two airbag fixation portions 22 of the cover sheet 3 are positioned outside the bracket 2.

(Description of Operation of Curtain Airbag Device)

Subsequently, a state where the airbag 1 is being inflated and deployed will be described with reference to FIG. 4.

When gas is injected into the airbag 1, the airbag 1 is inflated. When the airbag 1 is inflated, the winding of the airbag 1 that is wound in a rolled shape is released. At this time, the airbag 1 pushes inward the roof head lining 5 in the passenger compartment of the vehicle. Accordingly, the roof head lining 5 is disengaged from the pillar garnish 6 positioned therebelow, and the roof head lining 5 is bent inward in the passenger compartment of the vehicle. As a result, a gap S is formed between the roof head lining 5 and the pillar garnish 6. The airbag 1 is inflated and deployed inward in the passenger compartment of the vehicle from the gap S along the guiding plate portion 11 of the bracket 2. The airbag fixation portions 22 of the cover sheet 3 are broken by the inflation of the airbag 1.

(Operation and Effects)

When the airbag 1 is deployed, the plurality of slits 13a and 13b provided in the guiding plate portion 11 of the bracket 2 are covered with the cover sheet 3 (main sheet body portion 21) that is positioned between the airbag 1 and the guiding plate portion 11. That is, the cover sheet 3 (main sheet body portion 21) covers the plurality of slits 13a and 13b in a state where the cover sheet 3 is interposed between the airbag 1 and the guiding plate portion 11 (that is, in, a state where the cover sheet 3 is positioned between the airbag 1 and the guiding plate portion 11). Accordingly, the airbag 1 is prevented from entering gaps of the plurality of slits 13a and 13b, and from being hooked in edge portions of the plurality of slits 13a and 13b. Since the plurality of slits 13a and 13b are deformed to collapse, an impact load exerted on the bracket 2 is absorbed. In the curtain airbag device 100 according to the embodiment, it is possible to achieve both an impact absorbability of the bracket 2 that functions as a guide when the airbag is deployed, and a deployability of the airbag 1, which is better than that of an airbag in the related art.

In the embodiment, the cover sheet 3 covers not only the plurality of slits 13a and 13b but also the both ends 11a of the guiding plate portion 11 in the direction orthogonal to the deployment direction of the airbag 1. In this configuration, it is possible to further improve a deployability of the airbag 1, and it is possible to prevent the airbag 1 from being damaged at the both ends 11a (edge portions) of the guiding plate portion 11 when the airbag 1 is deployed. Even in a case where the both ends 11a of the guiding plate portion 11 are bent diagonally outward and downward with respect to the portion in which the plurality of slits 13a and 13b are provided, it is possible to prevent the airbag 1 from being damaged when the airbag 1 is deployed. However, in the configuration in which the both ends 11a of the guiding plate portion 11 are bent, manufacturing cost of the bracket is increased. For this reason, the configuration of the embodiment is preferred compared to the configuration in which the both ends 11a of the guiding plate portion 11 are bent.

In the embodiment, the cover sheet 3 (main sheet body portion 21) is fixed to the upper surface of the guiding plate portion 11 in advance. In this configuration, the airbag 1 is much reliably prevented from entering the gaps of the plurality of slits 13a and 13b, and from being hooked in the edge portions of the plurality of slits 13a and 13b. For example, as illustrated in FIG. 1, the fact that "the cover sheet 3 (main sheet body portion 21) is fixed to the upper surface of the guiding plate portion 11 in advance" means the fact that the cover sheet 3 (main sheet body portion 21) is fixed to the upper surface of the guiding plate portion 11 in a state where the curtain airbag device 100 is attached to the vehicle body, that is, in a state where the airbag 1 is not inflated and not deployed. In this regard, in the second embodiment to be described later, a cover sheet 7 is wound around the airbag 1 that is not inflated and not deployed in a state where the curtain airbag device 101 is attached to the vehicle body, that is, in a state where the airbag 1 is not inflated and not deployed.

In the embodiment, as described above, the two airbag fixation portions 22 of the cover sheet 3 are positioned outside the bracket 2. In this configuration, for example, the main sheet body portion 21 is unlikely to slip out of place compared to when the airbag fixation portions 22 are provided in the vicinity of a center portion of the main sheet body portion 21 (bracket 2). Accordingly, when the airbag 1 is inflated and deployed, the plurality of slits 13a and 13b (fragile portion) are much reliably covered with the main sheet body portion 21 of the cover sheet 3.

(Second Embodiment)

Figure 5:
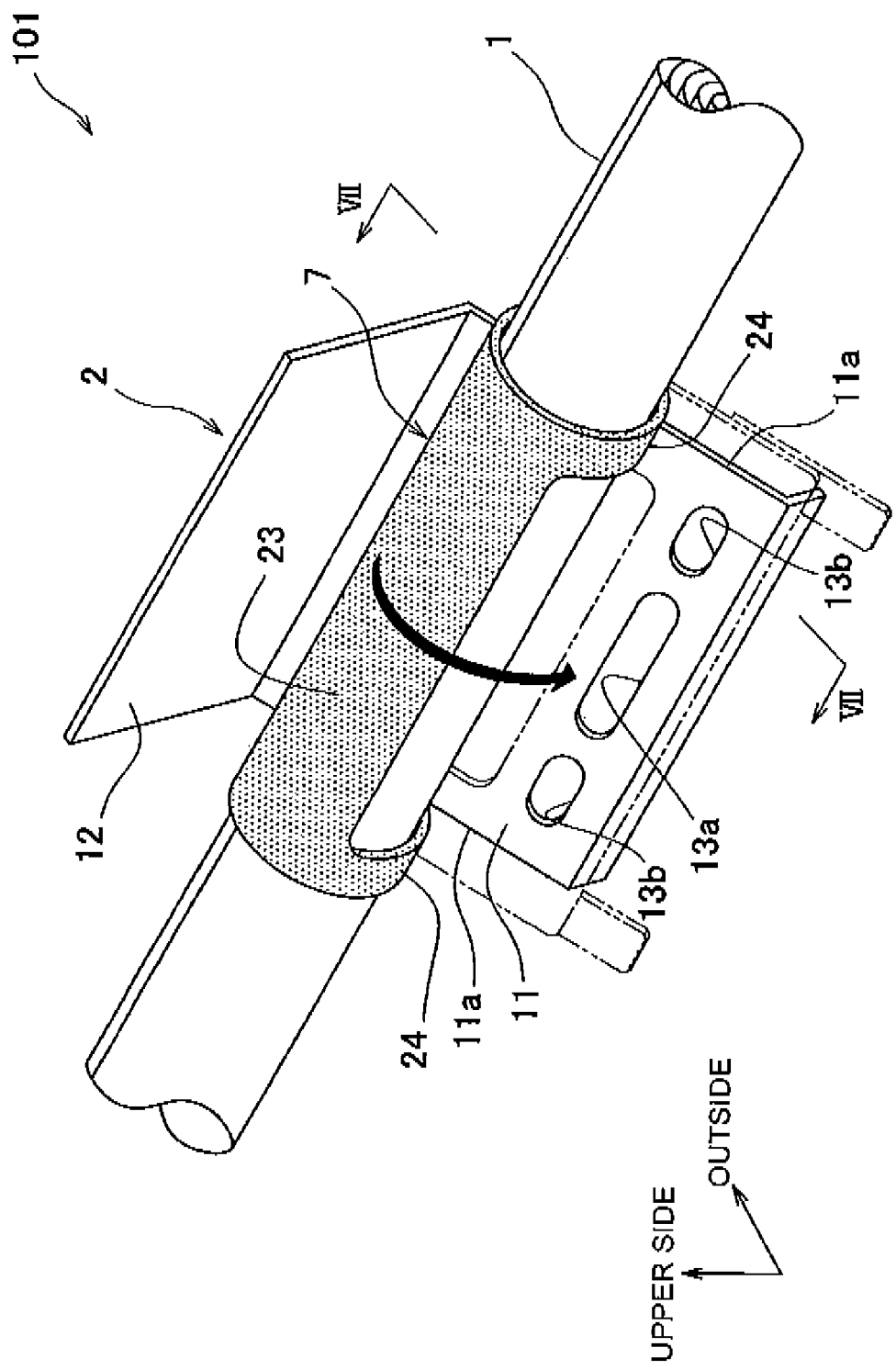
FIG. 5 is a perspective view of a curtain airbag device according to a second embodiment.
Figure 6:
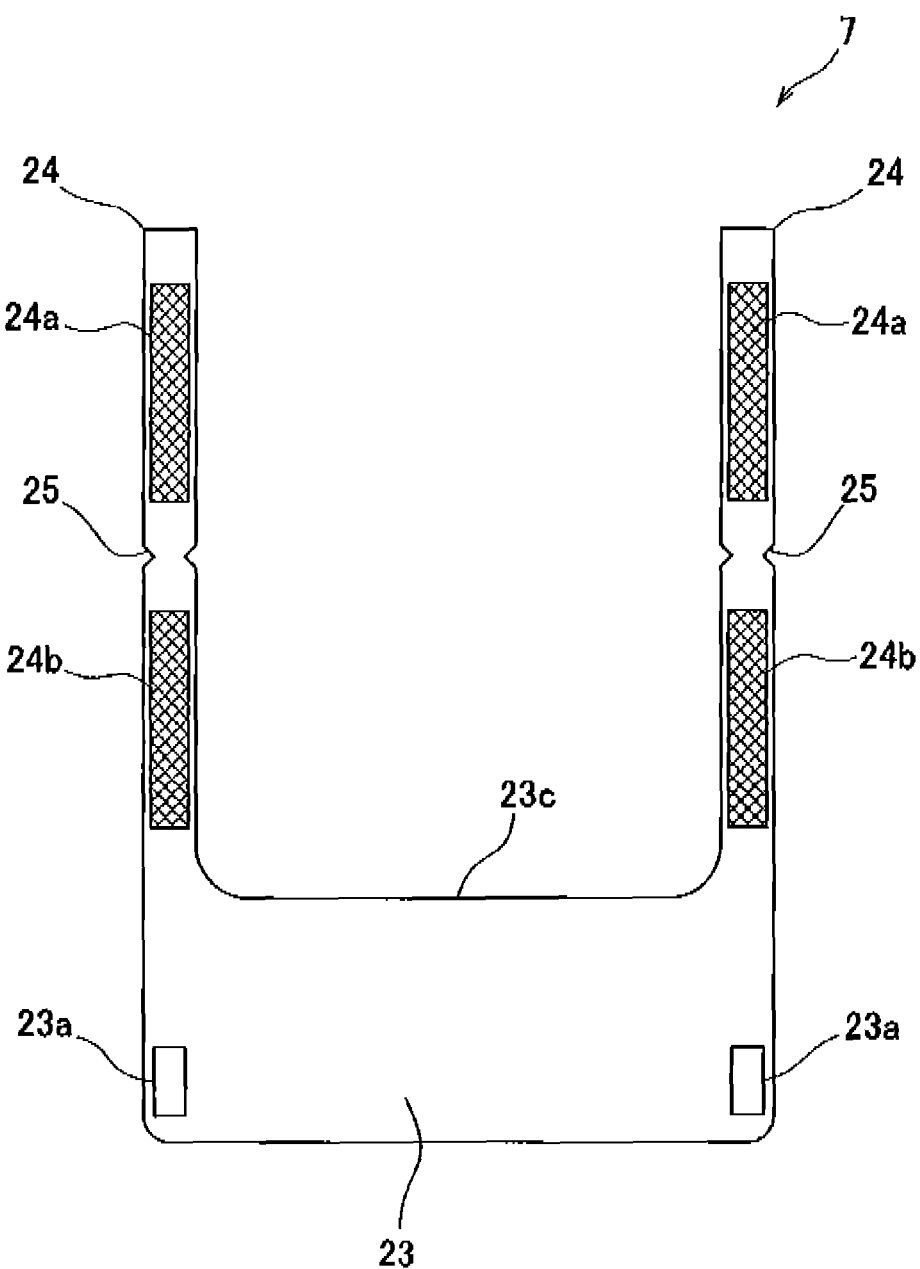
FIG. 6 is a top view of a cover sheet.
Figure 7:
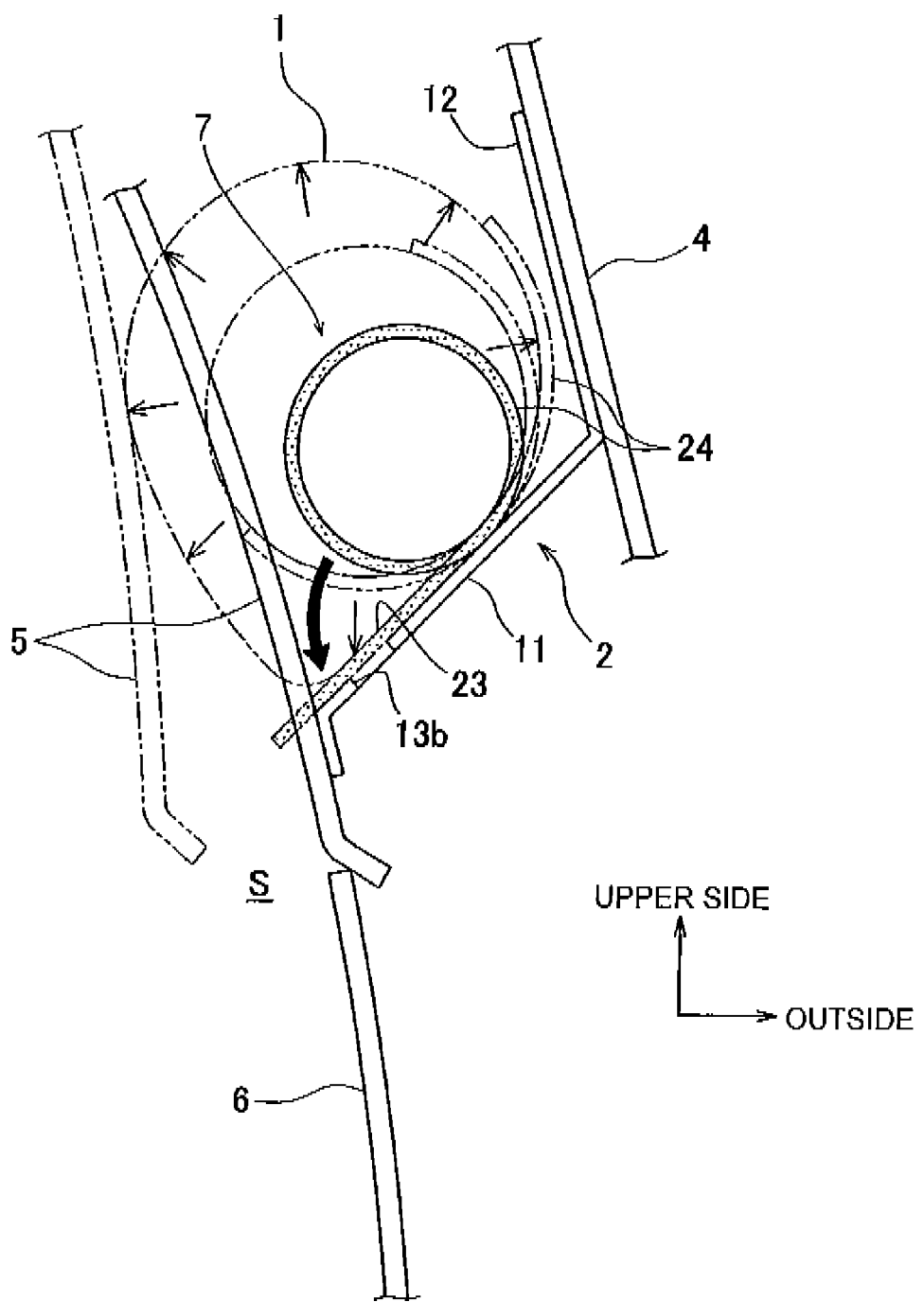
FIG. 7 is a view illustrating a state where an airbag is being inflated (a view when seen in a direction of arrow VII-VII in FIG. 5).

FIGS. 5 to 7 are views describing the second embodiment. In FIGS. 5 to 7, the same reference signs are assigned to the same parts that configure the curtain airbag device 100 according to the first embodiment.

As described above, in the embodiment, a cover sheet 7 (indicated by dot hatching in FIGS. 5 and 7) is wound around the airbag 1 that is not inflated and not deployed (refer to FIG. 5).

As illustrated in FIG. 6, the cover sheet 7 has a main sheet body portion 23 and an airbag fixation portion 24. In the embodiment, the cover sheet 7 has a pair of the airbag fixation portions 24. When the airbag 1 is inflated and deployed, the main sheet body portion 23 covers all the slits 13a and 13b. The airbag fixation portion 24 is fixed to the airbag 1 that is not inflated and not deployed. Accordingly, the cover sheet 7 is fixed to the airbag 1 that is not inflated and not deployed. The material of the cover sheet 7 is a soft resin, waterproof coated paper, a cloth or the like.

The main sheet body portion 23 has an approximately rectangular shape. Even in the embodiment, the main sheet body portion 23 covers not only all the slits 13a and 13b but also the both ends 11a of the guiding plate portion 11 in the direction orthogonal to the deployment direction of the airbag 1.

Adhesive tabs 23a are provided in both end portions of the main sheet body portion 23. The main sheet body portion 23 is wound around the airbag 1 that is wound in a rolled shape. The main sheet body portion 23 is fixed to an outer circumferential surface of the airbag 1 by adhesive means such as an adhesive.

Each of the airbag fixation portions 24 has a straplike shape. The airbag fixation portion 24 is provided at both ends of a proximal end portion 23c of the main sheet body portion 23, respectively. A sheet of each of adhesive tapes 24a and 24b (indicated by cross hatching in FIG. 6) is bonded to each of the airbag fixation portions 24. V-shaped notches 25 are formed in a portion of the airbag fixation portion 24 between the adhesive tape 24a and the adhesive tape 24b. That is, the notches 25 are formed in a middle portion of the airbag fixation portion 24. A pair of the adhesive tapes 24a and 24b and the notches 25 are arranged symmetrically on the left and the right of the airbag fixation portion 24, respectively. The airbag fixation portion 24 together with the main sheet body portion 23 is wound around the airbag 1 that is wound in a rolled shape. The airbag fixation portion 24 is fixed to the outer circumferential surface of the airbag 1 by the adhesive tapes 24a and 24b.

(Description of Operation of Curtain Airbag Device)

Subsequently, when the airbag 1 is inflated and deployed, a motion of the cover sheet 7 will be described with reference to FIG. 7. When the airbag 1 is inflated and deployed, a motion of the airbag 1 is the same as that of the airbag 1 in the first embodiment.

The airbag fixation portions 24 of the cover sheet 7 are broken at the notches 25 by an inflation of the airbag 1. Accordingly, in a portion of the cover sheet 7 closer to a side of the main sheet body portion 23 than the notches 25, the cover sheet 7 is adhesively fixed to the airbag 1 at places where the two sheets of adhesive tapes 24b and the two adhesive tabs 23a are located.

(Operation and Effects)

When the airbag 1 is inflated and deployed, the portion of the cover sheet 7 closer to the side of the main sheet body portion 23 than the notches 25 is deployed. Accordingly, the main sheet body portion 23 covers the all the slits 13a and 13b that are provided in the guiding plate portion 11 of the bracket 2. That is, the main sheet body portion 23 covers all the slits 13a and 13b in a state where the main sheet body portion 23 is interposed between the airbag 1 and the guiding plate portion 11 (in a state where the main sheet body portion 23 is arranged between the airbag 1 and the guiding plate portion 11). Accordingly, the airbag 1 is prevented from entering the gaps of the plurality of slits 13a and 13b, and from being hooked in the edge portions of the plurality of slits 13a and 13b.

In the embodiment, the cover sheet 7 is wound around the airbag 1 that is not deployed. Accordingly, the airbag 1 and the cover sheet 7 are integrally assembled and thus, good handling is ensured when the assembly of the airbag 1 and the cover sheet 7 is transported or attached to a vehicle body.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A curtain airbag device that is accommodated in an upper portion of a passenger compartment of a vehicle, the curtain airbag device comprising:
    an airbag that is accommodated in a state where the airbag is wound or folded;
    a bracket that has a guiding plate portion which is provided with a fragile portion and guides the airbag inward in the passenger compartment of the vehicle when the airbag is deployed, the bracket is fixed to an upper portion of an inner panel of a vehicle body; and
    a cover sheet that, when the airbag is deployed, covers the fragile portion in a state where the cover sheet is interposed between the airbag and the guiding plate portion.

2. The curtain airbag device according to claim 1,
    wherein the cover sheet further covers both ends of the guiding plate portion in a direction orthogonal to a deployment direction of the airbag.

3. The curtain airbag device according to claim 1,
    wherein the cover sheet is fixed to an upper surface of the guiding plate portion in advance.

4. The curtain airbag device according to claim 1,
    wherein the cover sheet is wound around the airbag that is not deployed.

5. The curtain airbag device according to claim 1,
    wherein the cover sheet has a main sheet body portion that, when the airbag is deployed, covers at least the fragile portion in a state where the main sheet body portion is interposed between the airbag and the guiding plate portion, and an airbag fixation portion that fixes the cover sheet to the airbag that is not deployed, and
    wherein the airbag fixation portion is positioned outside of the bracket.

6. The curtain airbag device according to claim 5,
    wherein the main sheet body portion has a trapezoidal shape in which a width of the main sheet body portion becomes gradually narrow from a proximal-end side thereof to a distal-end side thereof.

7. The curtain airbag device according to claim 5,
    wherein a hooking catch is provided at a distal end of the guiding plate portion in the deployment direction of the airbag, and protrudes downward from a portion in which the fragile portion is provided,
    wherein a hooking portion is provided in a distal end portion of the main sheet body portion, and
    wherein the cover sheet is fixed to the upper surface of the guiding plate portion in advance by engaging the hooking portion with the hooking catch.

8. The curtain airbag device according to claim 5,
    wherein the airbag fixation portion has a straplike shape, and
    wherein a V-shaped notch is formed in a middle portion of the airbag fixation portion.

9. The curtain airbag device according to claim 5,
    wherein the cover sheet has a pair of the airbag fixation portions, and
    wherein the airbag fixation portions are provided at both ends of a proximal end portion of the main sheet body portion, respectively.

10. The curtain airbag device according to claim 1,
    wherein the bracket further has an attachment plate portion that extends upward from an end of the guiding plate portion and is fixed to the inner panel, and
    wherein the fragile portion is provided in an end portion of the guiding plate portion on a side opposite a side on which the attachment plate portion is provided.

11. The curtain airbag device according to claim 1,
    wherein the fragile portion is a plurality of slits that are provided in a line along an axial direction of the airbag in a state where the airbag is wound, and
    wherein, of the plurality of slits, a slit positioned at the center has a length greater than lengths of slits positioned at both ends thereof.

12. The curtain airbag device according to claim 1,
    wherein the cover sheet is made of a soft resin, waterproof coated paper or a cloth.

* * * * *